United States Patent [19]
Kahle et al.

[11] Patent Number: 5,153,635
[45] Date of Patent: Oct. 6, 1992

[54] MICROFILM VIEWER/PRINTER PROJECTION SYSTEM

[75] Inventors: Todd A. Kahle, Hartford; Robert E. Gunst, Neosho; James H. Westoby, Hartland, all of Wis.

[73] Assignee: Infographix, Inc., Sussex, Wis.

[21] Appl. No.: 682,787

[22] Filed: Apr. 9, 1991

[51] Int. Cl.⁵ .............................................. G03B 13/28
[52] U.S. Cl. ........................................ 355/45; 355/43
[58] Field of Search .................................... 355/43, 45

[56] References Cited

U.S. PATENT DOCUMENTS

| | | | |
|---|---|---|---|
| 3,002,434 | 10/1961 | Reuter, Jr. | 95/1.7 |
| 3,730,622 | 5/1973 | Freeman et al. | 355/14 |
| 3,765,759 | 10/1973 | Yamada | 355/45 |
| 3,782,820 | 1/1974 | Kohn et al. | 355/45 |
| 3,811,769 | 5/1974 | Heldenbrand et al. | 355/45 |
| 3,856,397 | 12/1974 | Suzuki et al. | 355/45 |
| 3,865,484 | 2/1975 | Heldenbrand et al. | 355/45 |
| 3,898,004 | 8/1975 | Tiger | 355/45 |
| 3,899,248 | 8/1975 | Tiger | 355/5 |
| 3,907,418 | 9/1975 | Okuyama | 353/77 |
| 3,922,083 | 11/1975 | Freeman et al. | 355/13 |
| 4,037,953 | 7/1977 | Some et al. | 355/45 |
| 4,056,318 | 11/1977 | Watanabe | 355/45 |
| 4,068,944 | 1/1978 | Leibundgut | 355/45 |
| 4,411,513 | 10/1983 | James | 355/5 |
| 4,494,859 | 1/1985 | Frias et al. | 355/5 |
| 4,616,922 | 10/1986 | Sobieski et al. | 355/14 |
| 4,636,059 | 1/1987 | Thompson | 355/454 |

Primary Examiner—Richard A. Wintercorn
Attorney, Agent, or Firm—Quarles & Brady

[57] ABSTRACT

A microfilm viewer/printer projection system particularly adapted for full plane plain paper copying has a first, a second and a third mirror which selectively project a document image from a horizontal object plane to a vertical viewing plane or a horizontal exposure plane. In the view mode, the first and second mirrors reflect the document image to a screen which defines the viewing plane. An AC motor movement drives the first and second mirrors to a print mode, in which the second mirror is parked in a parking zone which is enveloped by the projection path from the object plane to the exposure plane, which is defined by a belt type photoreceptor. In the print mode, the first mirror reflects the entire document image to the third mirror, which is a black mirror, and the third mirror reflects the entire document image to the photoreceptor, to expose the photoreceptor to the entire document image simultaneously.

19 Claims, 7 Drawing Sheets

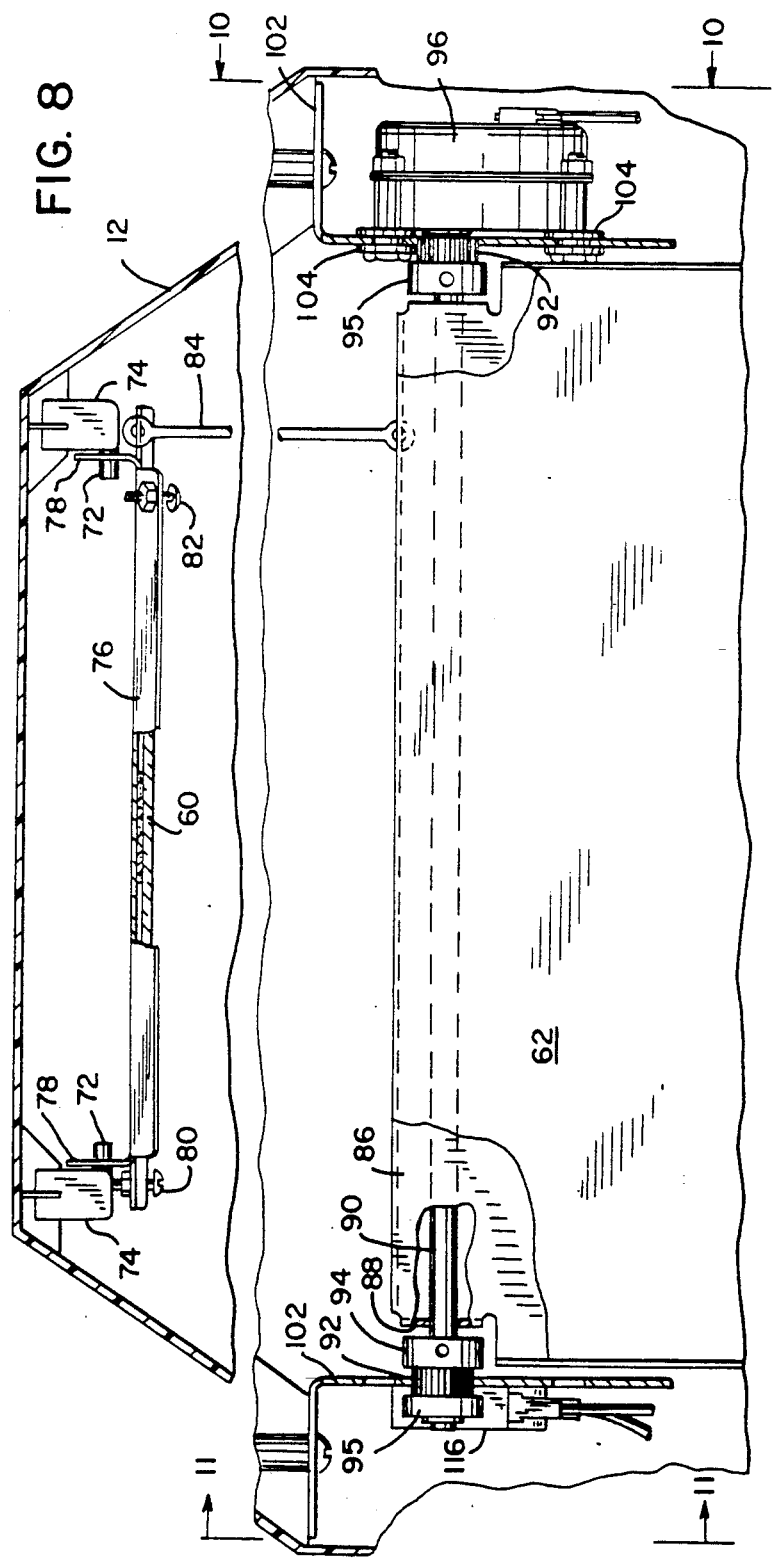
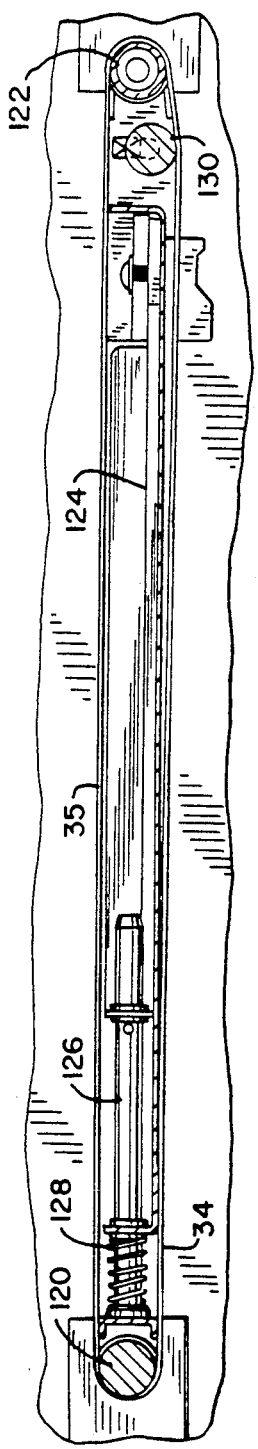
FIG. 8
FIG. 9

MICROFILM VIEWER/PRINTER PROJECTION SYSTEM

BACKGROUND OF THE INVENTION

1. Field of the Invention

The invention relates to a microfilm viewer/printer, and more particularly to a full plane exposure image projection system for a plain paper microfilm viewer/printer.

2. Discussion of the Prior Art

Microfilm is a well-known medium for storing and/or distributing large volumes of documents. Microfilm viewers are necessary for a user to read the documents stored on microfilm and microfilm printers are necessary to make a paper copy of a document stored on the microfilm. Consequently, machines performing both functions, commonly referred to as microfilm viewer/printers, are commercially available and widespread.

In microfilm viewer/printers, it has typically been the case that in a view mode of the machine, the machine user could observe an image of the document recorded on the microfilm at a viewing screen. In a print mode, the projection system inside the viewer/printer directs the image to a xerographic copying engine inside the viewer/printer which makes a paper copy of the image, typically by a scanning process.

In the scanning process, the image of the document is projected to the copying engine in sections by scanning consecutive portions of the document being reproduced. The scanning speed in such a device must be synchronized with the rate at which a receptor surface of the copying engine is moving. The mechanism for performing the scanning operation adds a level of complexity not necessary in full plane exposure systems. Also, the overall size of the microfilm viewer/printer is larger in order to house the scanning mechanism.

A major difference between microfilm viewer/printers and copy machines is that the object being copied on a copy machine is usually copied at a ratio of no more than 2 to 1 as compared with copies made from microfilm that are copied at a ratio of from about 12:1 up to about 72:1. This difference makes scanning an object on a copy machine relatively non critical whereas the scanning of an object on a microfilm viewer/printer requires extremely smooth movement of the scanning device. Otherwise, the image being scanned will be blurred. The critical nature of the scanning mechanism on a microfilm viewer/printer results in this mechanism being more complex and more costly than the scanning mechanism of a copy machine.

It has become accepted in the industry to provide a carrier for the microfilm which can be moved to position the image of the desired document of the microfilm on the viewing screen. It has also become generally preferred to use a plain paper copying engine, rather than a treated paper type engine. With the plain paper engine, separate sheets of ordinary paper, usually of a standard size, for example 8.5 × 11 inch letter size, are placed in a stack in a paper cassette. The copying engine feeds sheets from the cassette as required to make copies and when the copies are made, the engine issues them to the exterior of the machine.

Microfilm viewer/printers utilizing full plane exposure are known, but a major problem with such prior viewer/ printers has been their size, which in large part has been required by their projection systems. Since the viewer/ printers are typically kept on a desk or countertop, it is important that their "footprint" on the countertop be as small as possible. The cost of such machines has also in part been determined by the complexities of the projection systems and the mechanisms associated with the projection systems.

SUMMARY OF THE INVENTION

The invention provides a microfilm viewer/printer for reproducing an image of a document recorded on microfilm onto a receptor sheet which overcomes the above problems. Means defining an object plane are provided for holding the microfilm bearing a microimage of the document to be reproduced. Means are also provided defining a viewing plane from which a user can view a projected image of the document. A photoreceptor defines a substantially horizontal exposure plane, and projection means are operable by the user to selectively project an image of the document from the object plane to either the viewing plane or to the exposure plane. By providing a horizontal exposure plane, a paper cassette can be positioned so as to feed sheets from the cassette through the machine from side to side.

In a preferred form, the photoreceptor is sized and shaped to be simultaneously exposed to a projected image of substantially the entire document. Therefore, the photoreceptor surface in the exposure plane is at least as large as the document image projected at the exposure plane, which would typically be substantially the same size as the receptor sheet. In a preferred form of the photoreceptor, the photoreceptor is provided as a belt of photoconductive material, which is at least twice as long as the corresponding dimension of an entire document image projected to the exposure plane.

In a preferred form, the projection means includes the same number of mirrors along a projection path from the object plane to the viewing plane as the number of mirrors along a projection path from the object plane to the exposure plane. First and second mirrors are moveable from view positions to exposure positions. In the view positions, the first mirror reflects a document image from the object plane to the second mirror, and the second mirror reflects the image to the viewing screen. In the exposure positions, the second mirror is parked out of the projection path and the first mirror is repositioned to reflect the image to a third mirror which reflects the image to the exposure plane at the photoreceptor.

In an especially useful form, the exposure position of the second mirror positions the second mirror in a parking zone which is rearward of a projection path from the object plane to the first mirror, below the projection path from the first mirror to the third mirror, and forwardly of the projection path from the third mirror to the exposure plane. Thus, the second mirror is enveloped by the projection path from the object plane to the exposure plane, thereby avoiding moving the mirror considerably further which would be the case if it were moved to one side or the other of the projection path.

In another aspect, the first and second mirrors are connected to move in unison between the view and exposure positions and are driven by an alternating current motor movement. The motor is nondirectional, so that an on signal will cause it start in either direction so as to move the first and second mirrors between the view and exposure positions by simply turning the motor on.

BRIEF DESCRIPTION OF THE DRAWINGS

FIG. 8 is a detail fragmentary view illustrating the mountings and drive mechanisms for two mirrors of the FIG. 9 is a sectional view taken along the plane of the line 9—9 of FIG. 6 illustrating a photoreceptor belt for the microfilm viewer/printer projection system;

DETAILED DESCRIPTION OF THE PREFERRED EMBODIMENT

Figure 1:
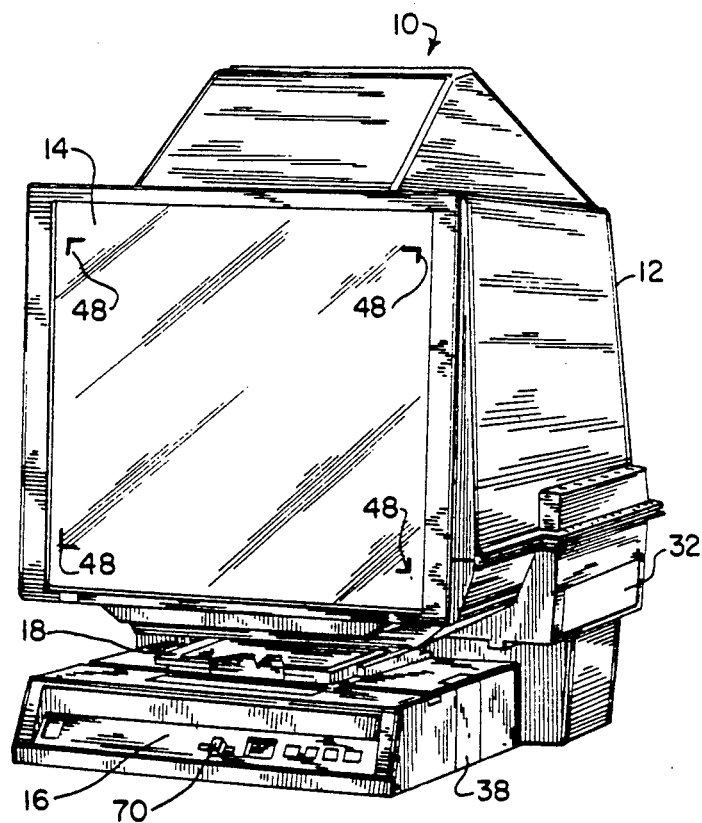
FIG. 1 is a front perspective view of a microfilm viewer/printer of the invention.
Figure 2:
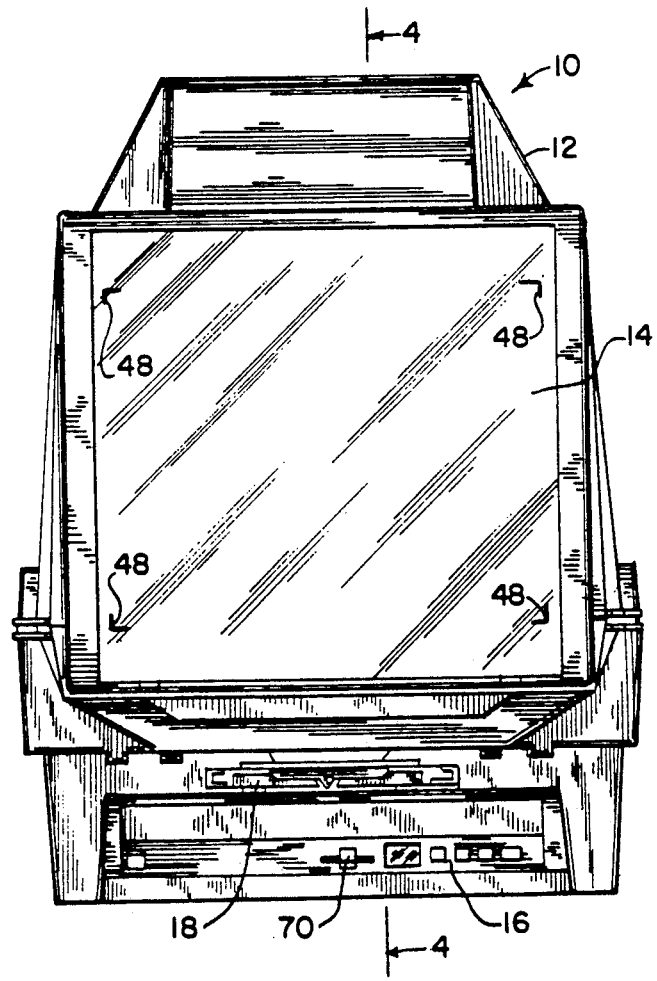
FIG. 2 is a front plan view of the microfilm viewer/printer of FIG. 1.
Figure 3:
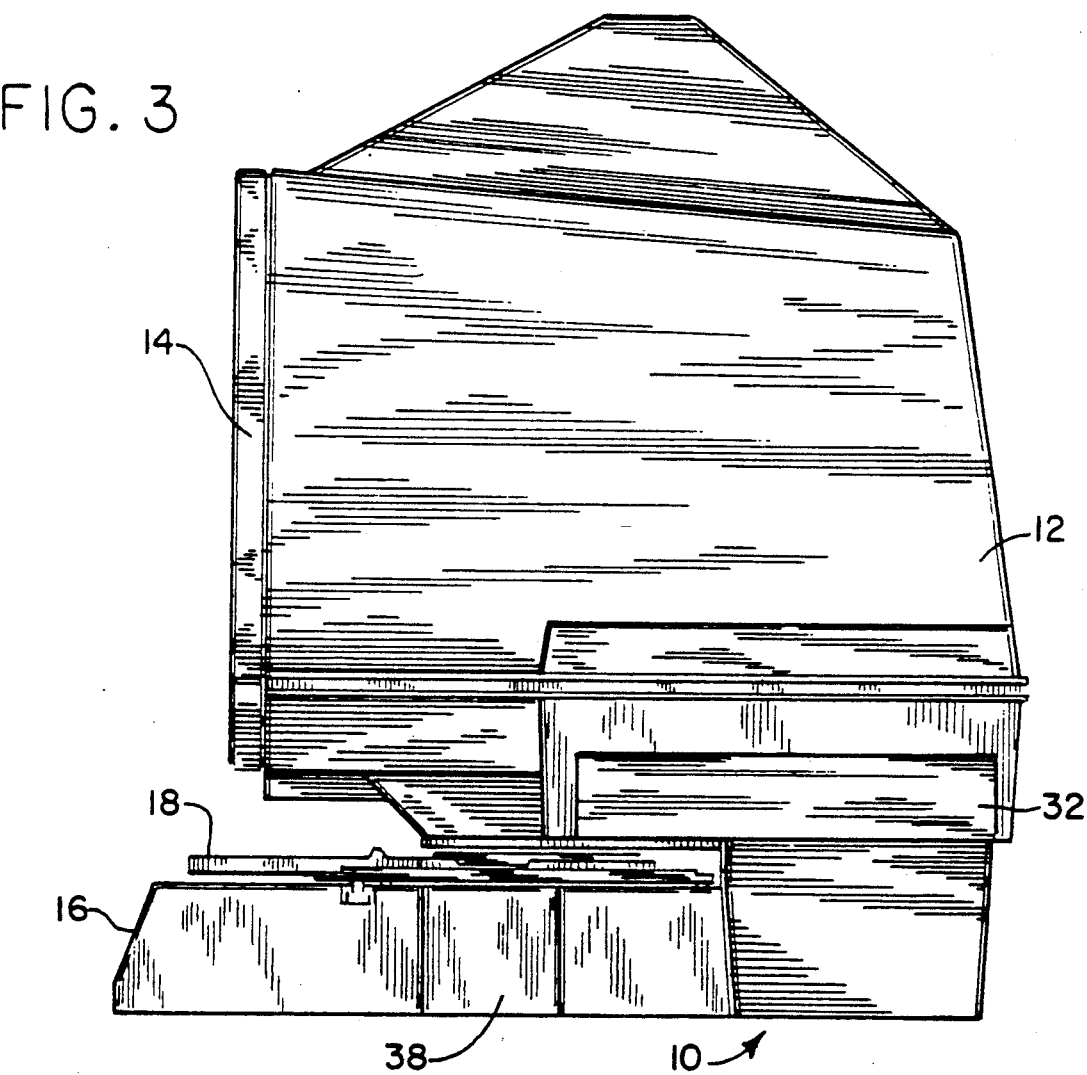
FIG. 3 is a right side plan view of the microfilm viewer/printer of FIG. 1.

FIGS. 1-3 are exterior views of a viewer/printer 10 incorporating the invention. The viewer/printer 10 has a housing 12 which at its front has a screen 14 in a generally vertical viewing plane, a control panel 16 and a microfilm carrier 18. The microfilm viewer/printer 10 is placed on a desk or countertop with a user sitting in front of and facing the machine to operate the carrier 18 and control panel 16 so as to view a document recorded on the microfilm on the screen 14 or to print the document.

In viewing a document on the screen 14, the view mode is selected on the control panel 16 and the carrier 18 is moved so as to place the document desired to be viewed over a relatively small image area which gets projected to the viewing screen 14. Referring to FIGS. 4-7, an object plane 22 is defined between two flat glass plates 24 and 25, which are carried by the carrier 18. A microfilm sheet held in the object plane 22 between the glass plates 24 and 25 is moved in any direction in the object plane 22 to position the document desired to be viewed in the image area of the object plane. The document desired is then projected to either the viewing screen 14 for viewing by the user or to an electrophotographic copying engine 30 housed in the rear portion of the viewer/printer 10. While in the preferred embodiment a carrier 18 for microfilm sheets is employed, it should be understood that the principles of the invention could also be applied to other forms of microfilm, for example, roll type microfilm.

Any suitable electro-photographic copying engine 30 may be employed in practicing the invention. However, to fully realize the advantages afforded by the invention, the copying engine should be a plain paper type copying engine capable of "full plane" exposure. A "plain paper" type copying engine has a photoreceptor which is a reusable photoconductor element that is charged and exposed to a projected document image to produce a latent electrostatic image on the photoreceptor. The latent electrostatic image formed on the photoreceptor by exposing it to the document image is subsequently developed using fine developer particles which in turn are transferred to a sheet of paper and fused to the paper to make the copy. In the embodiment illustrated, a belt type photoreceptor 34 is employed by the electrophotographic copying engine 30 and presents an upwardly facing surface in a horizontal exposure plane 35. Further details of an electro-photographic copying engine 30 usable in practicing the present invention are described in copending, commonly owned U.S. patent application Ser. No. 07/627,678 filed Dec. 14, 1990 entitled "Electrostatic Image Developer Dispenser" and in co-pending, commonly owned U.S. patent application Ser. No. 07/682,2782 filed on the same day as the present application and entitled "Electro-photographic Copying Process", the disclosures of which patent applications are hereby incorporated by reference.

What is meant by "full plane" exposure is that a microimage of an entire document positioned within the image area 20, is projected and simultaneously exposed to the copying engine. That is, the entire image of which a copy is desired to be made is simultaneously exposed to the photoreceptor. This is in contrast to many prior art microfilm viewer/printers in which the copying engine was serially exposed to portions of the entire document by a scanning process, to produce a copy of the entire document Still referring to FIGS. 1-3, for the print mode of the viewer/printer 10, it is desirable to provide the sheets of paper on which copies are to be made in a paper cassette tray 32 which is inserted on the right side of the viewer/printer 10. Individual sheets typically of a standard size (e.g., 8.5 × 11 inches) are stacked in the paper tray 32 and are fed by suitable means from the stack to the copying engine 30 for document images to be transferred to them Completed copies exit the machine 10 through a slot (not shown) provided on the left side of the machine as viewed in FIGS. 1 and 2. Further details about the paper path through the machine 10 are described in the co-pending, commonly owned U.S. patent application Ser. No. 07/682,782, filed on the same day as this application, and entitled "Electro-photographic Copying Process", referred to above. Thus, in "full plane exposure" plain paper development, a photoreceptor such as the photoreceptor 34 is exposed simultaneously by the projection system to the entire image which ultimately is copied onto a sheet from the paper cassette Hence, the surface of the photoreceptor 34 in the exposure plane 35 is at least as large as the paper held in the paper cassette, in order to fully utilize the area of each sheet.

The viewer/printer 10 has a projection system which allows selectively projecting a document image from the object plane 22 to either the viewing plane defined by the screen 14 or to the exposure plane 35 defined by the photoreceptor 34. The projection system for the viewer/printer 10 includes a light source 36 provided in a drawer 38 which mounts a bulb and reflector unit 40, a heat filter 41, a right angle reflector 42, and a Fresnel lens 43. The light source 36 provided by the drawer 38 results in a vertical upwardly directed converging beam of light passing through the object plane 22 in the image area 20 thereof A focusing lens 46 is provided directly above the image area of the object plane to focus the image in the image area 20 at the object plane 22 at a certain distance away from the object plane 22. In the preferred embodiment, this distance is approximately 33 inches. This distance is substantially the same regardless of whether the document image from the object plane 22 is being projected to the viewing plane at the viewing screen 14 or to the exposure plane 35 at the photoreceptor 34 surface. That being the case, the projected document image at the viewing plane or at the exposure plane is in focus and projected to approximately the same level of magnification. It is also possible to provide different lenses 46 to produce different levels of magnification at the same object to image distance.

Figure 4:
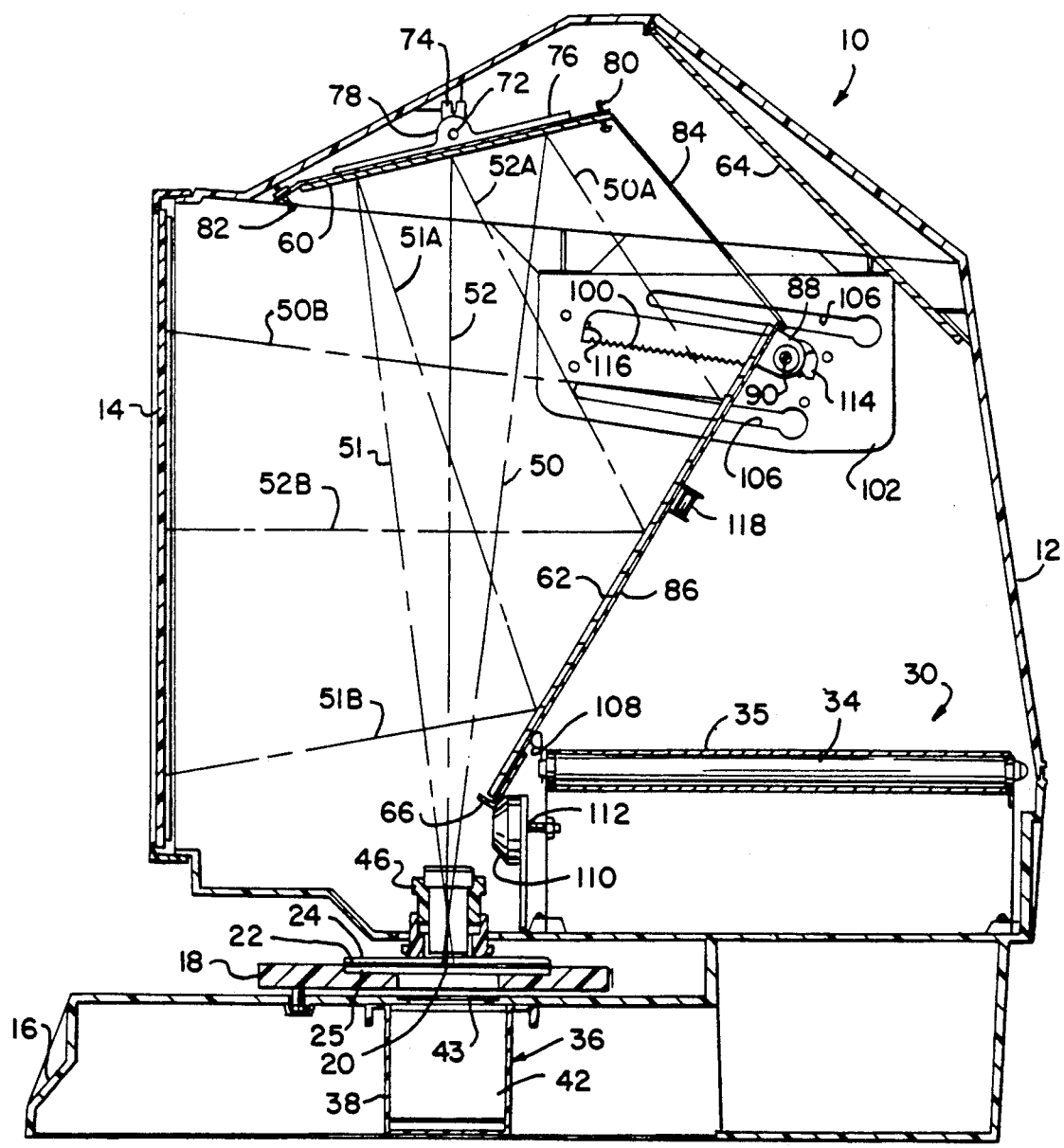
FIG. 4 is a sectional view taken along the plane of the line 4—4 of FIG. 2 illustrating the projection system of the viewer/printer in a view mode.
Figure 5:
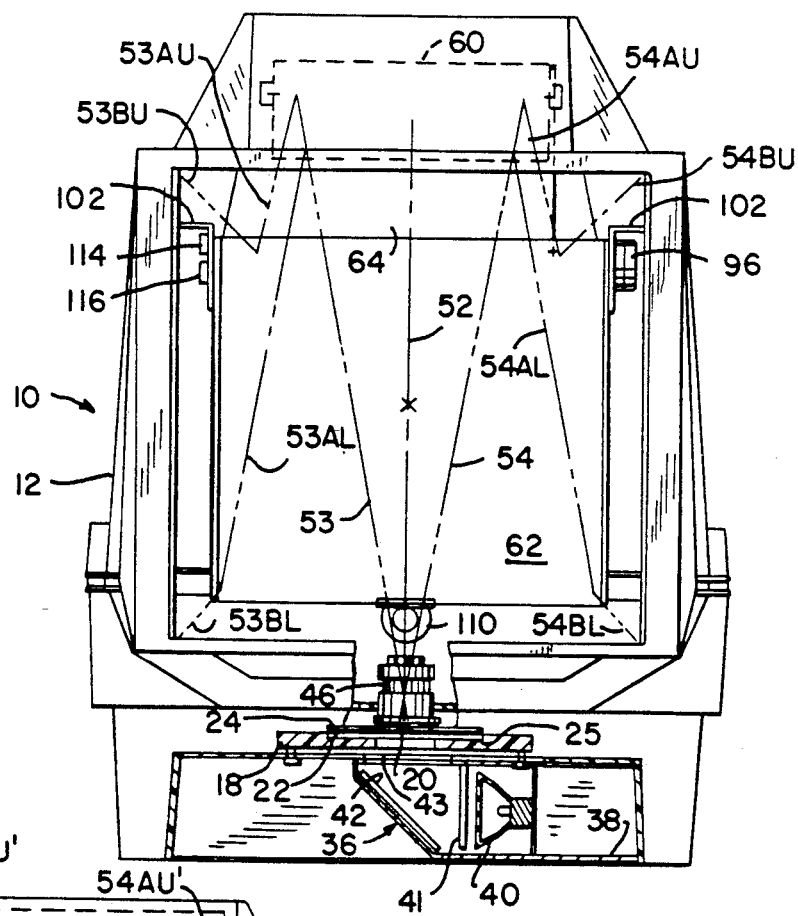
FIG. 5 is a front plan view of the microfilm viewer/printer with portions removed to show the projection system in the view mode.

FIGS. 4 and 5 illustrate the projection system of the viewer/printer 10 in the view mode. For ease of description, it is helpful to imagine that a microfilm is held by the carrier 18 in the object plane 22 (between the glass plates 24 and 25) with a document image on the microfilm in the image area. Typically, the original document of which the image on the microfilm is a copy is a standard size. For example, a common size for originals is the standard 11 inch high by 14 inch wide computer document, hereinafter referred to as a "comdoc". Other sizes are of course also possible. However, for ease of description, let it be assumed that a comdoc microimage on the microfilm is positioned using the carrier 18 in the image area 20 so that its image is projected to the viewing plane defined by the screen 14. In this regard, preferably corner markers 48 are printed or otherwise provided on the screen 14 so as to identify the boundaries of the image to be copied properly within the image area 20. Note that a comdoc, which in full size is 11 inches high by 14 inches wide, can be reduced in size to an image which is 8 ½ inches high by 11 inches wide to fit the ordinary and commonly available 8 ½ by 11 inch size of copier paper. In other words, the proportion of the height to width dimension of computer sized documents is the same as the proportion of the width to height dimensions of letter size documents. Thus, the corner markers 48 can conveniently define an area which is 8.5 inches high by 11 inches wide so that the image of an entire comdoc can be projected to the viewing plane within the boundaries of the marks 48.

Referring to FIG. 4, ray 50 represents the top border (as viewed on the viewing screen 14) of a document positioned within the corner markers 48, ray 51 represents the bottom border of the document and ray 52 represents a central ray of the document In FIG. 5, ray 53 represents the left border or edge of a document positioned within the corner markers 48, ray 54 represents the right border of the document and ray 52 is, as stated above, the central ray. Thus, rays 50-54 represent the projection of a rectangular or square document which is positioned at the viewing plane of the screen 14 within the corner markers 48. The rays 50-54 emanate from the image area 20 identically regardless of whether the projection system is in the view mode as shown in FIGS. 4 and 5 or whether it is in the print mode shown in FIGS. 6 and 7.

In the view mode, a first mirror 60 and second mirror 62 are in the positions shown in FIGS. 4 and 5. The first and second mirrors 60 and 62 are preferably high quality optical mirrors having a reflectivity of approximately 90% or greater. Substantially all of the light impinging upon these mirrors is reflected.

As shown in FIG. 4, rays 50-52 are reflected by the first mirror 60 to form rays 50A, 51A and 52A, respectively, which are directed toward the second mirror 62. The second mirror 62 in turn reflects rays 50A-52A to form rays 50B, 51B and 52B, respectively, which impinge upon the viewing screen 14 at the viewing plane. Since the viewing screen 14 is made of or coated with a light filtering material, a human eye at the front of the screen 14 can detect the image projected onto the screen 14 from the rear.

Referring to FIG. 5, the rays represented by lines 53 and 54 are reflected by the first mirror 60 into rays 53AL and 54AL at the lower edge of the image and into rays 53AU and 54AU at the upper edge of the image. Rays 53AL, 54AL, 53AU and 54AU are reflected by the second mirror 62 respectively into rays 53BL, 54BL, 53BU and 54BU, which are directed toward the corners of the screen 14 to focus at the viewing plane defined by the screen 14.

Figure 7:
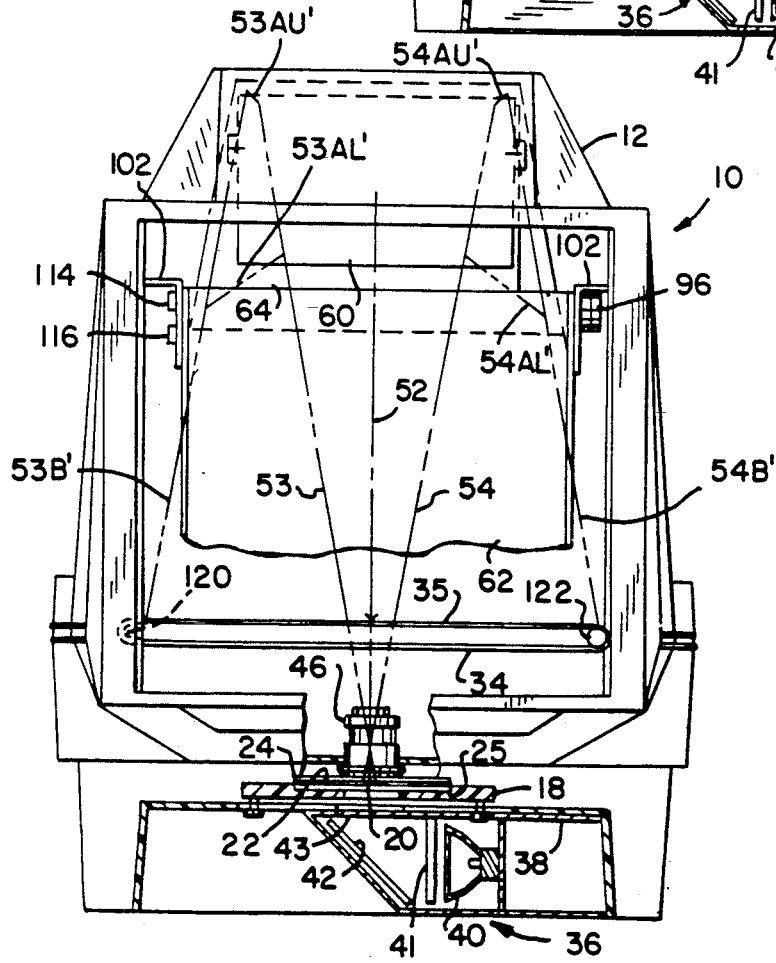
FIG. 7 is a view similar to FIG. 5 but showing the projection system in the print mode.
Figure 6:
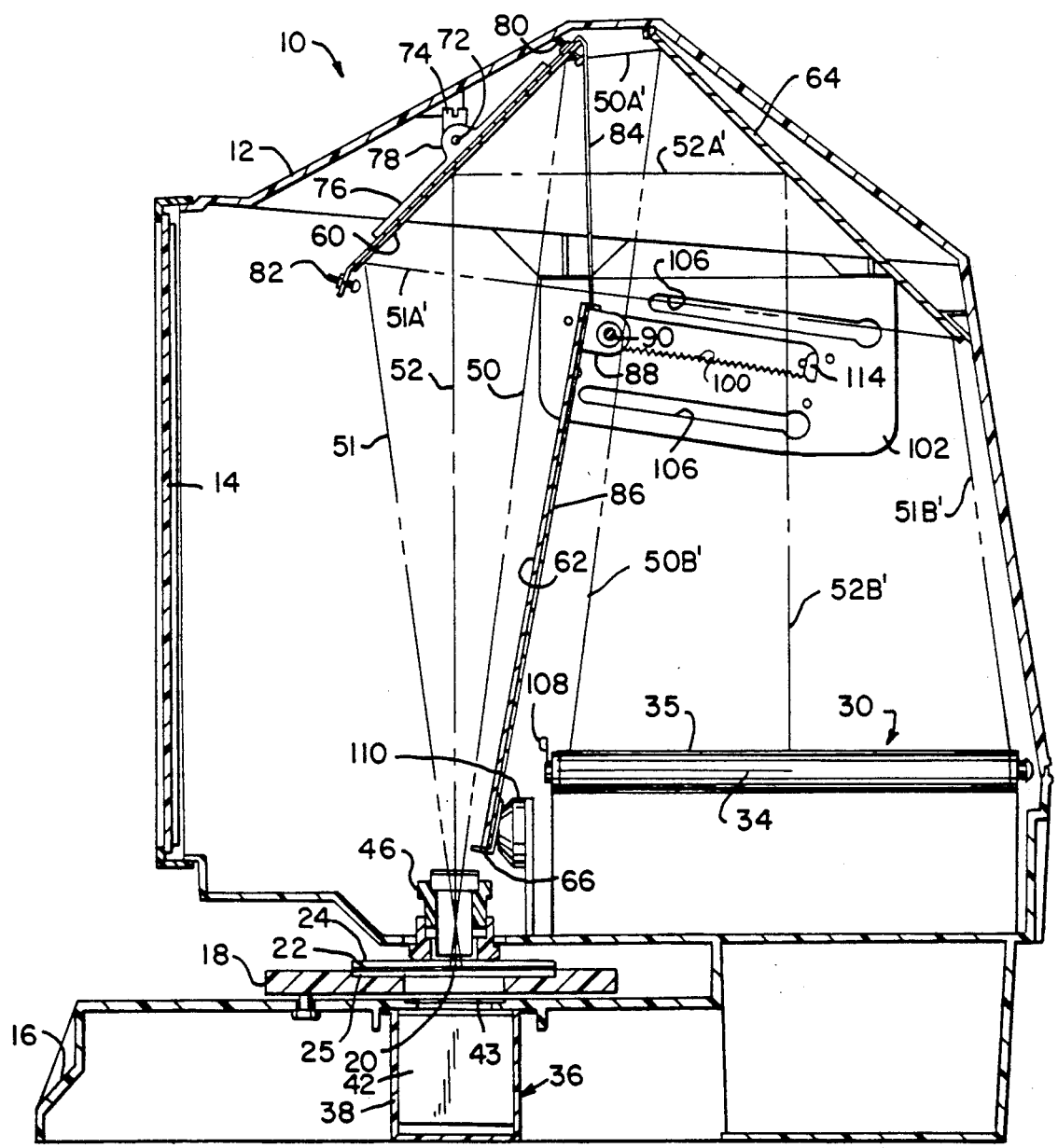
FIG. 6 is a view similar to FIG. 4 but showing the projection system in a print or exposure mode.

In the print mode shown in FIGS. 6 and 7, the first mirror 60 and the second mirror 62 are in the positions shown in FIGS. 6 and 7. Referring to FIG. 6, the rays 50-52 are reflected by the first mirror 60 into rays 50A', 51A' and 52A', respectively, toward a third mirror 64. Third mirror 64 reflects rays 50A', 51A' and 52A' to form rays 50B', 51B' and 52B', which are directed toward the photoreceptor 34 to focus at the exposure plane 35.

Referring to FIG. 7, the rays 53 and 54, which represent the left and right edges of a document in the image area 20 of the object plane 22, are reflected by the first mirror 60 into rays 53AL' and 54AL', which represent respectively the left and right lower corners of the document, and into rays 53AU' and 54AU', which represent respectively the left and right upper corners of the document. The rays 53AU' and 53AL' are reflected by the third mirror 64 into rays represented by line 53B', which represents the left edge of the document, and rays 54AL' and 54AU' are reflected by the third mirror 64 into rays represented by line 54B', which represents the right edge of the document.

In the print mode, the second mirror 62 is not used in the projection path between the object plane and the exposure plane. Rather, the second mirror 62 is parked in a parking zone defined by ray 50, ray 51A', and ray 50B'. To ensure that the second mirror 62 does not reflect diverging light and thereby interfere with the projection path between the object plane 22 and the exposure plane 35 in the print mode, an L-shaped shading device 66 is utilized at the base of the mirror 62 which places the central portion of the mirror 62 in a shadow so that diverging rays between the object plane and the first mirror 60 are not reflected by the second mirror 62. It should also be understood that suitable blinds or other shading devices should be employed at the edges of the mirror 62 to prevent ambient light entering the viewer/printer 10 through the screen 14 from reaching the photoreceptor 34.

In the preferred embodiment, the mirror 64 has a low reflectivity and may be referred to as a "black mirror". The mirror 64 in the preferred embodiment is simply a plate of optical quality glass with a flat black coating on its rear side. The reason for providing the mirror 64 as having low reflectivity is to avoid providing an excessive intensity of light at the exposure plane 35 which may overexpose the photoreceptor 34.

The fore and aft dimension of the photoreceptor 34 shown in FIG. 6, which corresponds to the height-wise dimension of the image projected onto the screen 14, is substantially equal to the height of the borders defined by the corner marks 48. Correspondingly, the lateral dimension of the photoreceptor 34 from side to side as best shown in FIG. 5 is substantially equal to the lateral dimension on the screen 14 from side to side defined by the corner marks 48. Thus, a document positioned within the corner marks 48 on the screen 14 during the view mode will be projected in substantially the same dimensions at the surface of the photoreceptor 34 in the exposure plane 35 during the print mode.

During viewing at the screen 14, the light source 36 is continuously lit. During the print mode however, the light source 36 is lit for a certain period of time sufficient to expose the photoreceptor 34. The period of time may be adjusted with an appropriate slide control 70 as shown in FIGS. 1 and 2. The period of illumination is thereby adjusted to produce the best quality copy.

Figure 10:
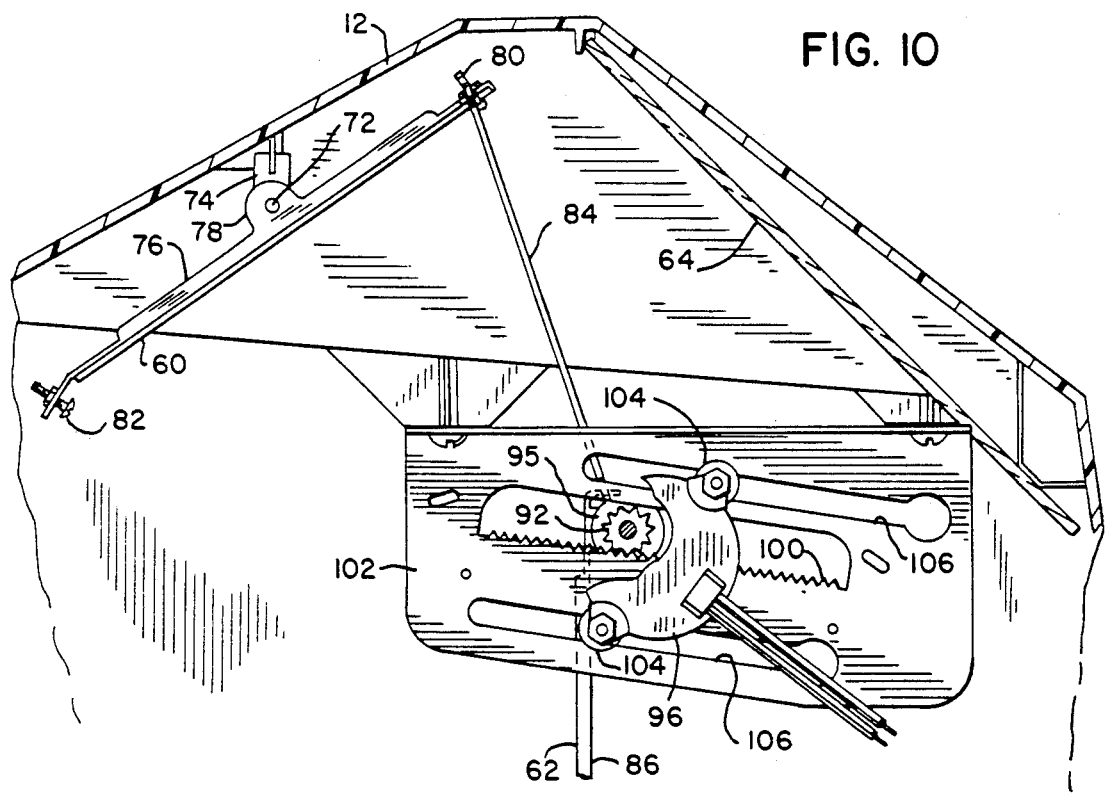
FIG. 10 is a detail view taken along the plane of the line 10—10 of FIG. 8 further illustrating the mountings of drive mechanisms for, and the relationships between, the mirrors of the projection system for the microfilm viewer/printer of FIG. 1.
Figure 11:
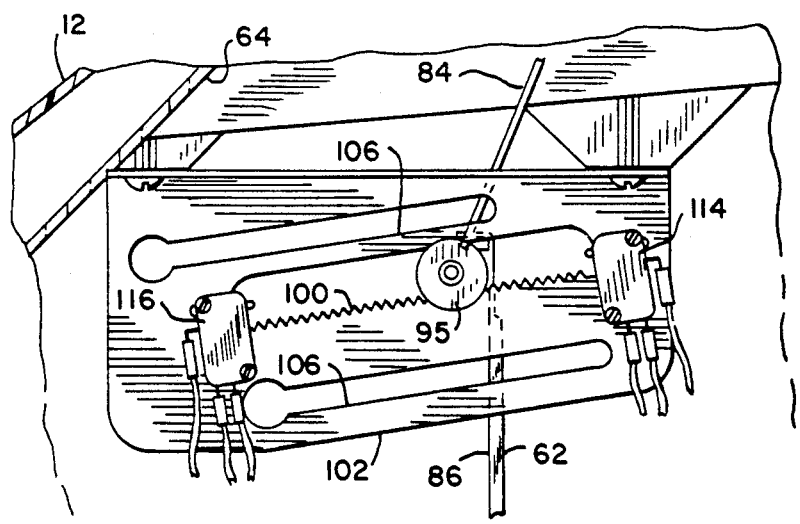
FIG. 11 is a detail view taken from the plane of the line 11—11 of FIG. 8.

The mirrors 60 and 62 are moved in unison by the mechanism illustrated in FIGS. 8, 10 and 11. The first mirror 60 is hinged on pins 72 of mounts 74 which are secured to the top of the housing 12. The mirror 60 is adhesively secured to a mounting plate 76 having ears 78 which pivotally fit over the pins 72. Adjustable stop screws 80 and 82 bear against the housing 12 in the extreme positions of the mirror 60 and are adjustable so as to adjust the angle of the mirror in its view and exposure positions (the view position being shown in FIG. 4 and the exposure position being shown in FIG. 6). The pivot axis provided by the ears 78 and pins 72 is positioned so as to provide a slight gravity bias of the mirror 60 into the print position shown in FIG. 6.

An elastic strap 84 connects the upper edge of the mounting plate 76 for the first mirror 60 to the upper edge of mounting plate 86 for the second mirror 62. The second mirror 62 is adhesively or otherwise secured to the mounting plate 86 and the mounting plate 86 has ears 88 at its upper side edges. A rod 90 is journaled in the ears 88 by suitable lubricious plastic bushings (not shown). The rod 90 bears a gear 92 at each end which is axially sandwiched between two locking collars 94 and 95 at the left end as viewed in FIG. 8 and is trapped at the right end by a locking collar 95 on the inside and an electric motor 96 on the outside. Each gear 92 meshes with a rack 100 formed in an L-shaped bracket 102 which is fastened to the top of the housing 12. The motor 96 also carries a pair of grooved rollers 104 which are diagonally opposed and ride in slots 106 of the right hand L-shaped bracket 102 as viewed in FIG. 8. The rollers 104 prevent the motor 96 from rotating relative to the bracket 102. The brackets 102 are identical, and the slots 106 in the left hand bracket 102 shown in FIG. 8 are not used. One end of the slots 106 (i.e. the rear end as shown in FIG. 10) can be made enlarged so as to facilitate assembly of the rollers 104 in the slots 106.

The electric motor 96 is an AC synchronous motor which is provided with no internal stops. As such, the motor is non-directional and will start in either direction at random. If rotation in one direction is prevented, the motor will start in the other direction.

The motor shaft, which extends from the left end of the motor as viewed in FIG. 8, is provided with a flat or other suitable means to drivingly engage the rod 90 and therefore the gears 92 held at the ends of the rod. As such, the gears 92 are driven by the motor 92 to walk along their corresponding racks 100. When at the rearward end of the rack, i.e., in the view position of the mirrors 60 and 62, if the print mode is selected at the control panel 16, an on signal is latched on and provided to the motor 96. If the motor 96 attempts to move the mirror 62 further rearwardly, it will be prevented since the motor is already at the rearward end of the rack 100. The motor will therefore start in the other direction to move the upper end of the mirror 62 forwardly along the rack 100. In doing so, the lower end of the mirror 62 slides on lubricious plastic wear pads 108 (see FIGS. 4 and 6) and on knob 110 until the position shown in FIG. 6 is reached by the mirror 62. In this position, slack has been provided in the elastic strap 84 so that the mirror 60 is gravity biased to the position shown in FIG. 6. Also note that the knob 110 is preferably mounted on a screw 112 so that turning the knob 110 will adjust the fore and aft position of the lower end of the mirror 62 so as to properly adjust its position relative to the projection path from the object plane 22 to the exposure plane 35 in the print mode.

At the forward end of travel in moving from the view position to the exposure position of the mirrors 60 and 62, the collar 95 actuates position switch 114 which turns power to the motor 96 off. The balance of forces and friction in the mechanism is sufficient to hold the mirrors 60 and 62 in this position. After exposure, the mirrors 60 and 62 return to the view position. In the view position of the mirrors 60 and 62, position switch 116 is actuated by collar 95 which turns off power to the electric motor 96. A spring mounted roller 118 may be provided at each side edge of the mirror 62 (See FIG. 4) to engage in the lower slots 106 at the corresponding side when the front of the mirror 62 is rotated upwardly, thereby holding the mirror 62 in the upward position so as to facilitate access to the rearward compartment of the housing 12 through the front of the machine 10.

As best shown in FIGS. 6, 7, and 9, the photoreceptor 34 used in the preferred embodiment is a belt type photoreceptor in which a belt made of a photoconductor material suitable for plain paper electro-photographic image transfer processes is rotatably mounted by end rollers 120 and 122 which are journaled on a frame 124. The roller 120 is mounted on sliding pins 126 which are spring biased by springs 128 so as to hold the photoreceptor belt 34 in tension. A third roller 130 is spring biased downwardly as viewed in FIG. 9 so as to maintain a certain spacing between the surface of the photoreceptor 34 and the developer dispenser, as more fully described in U.S. patent application Ser. No. 07/627,678, referred to above. The roller 122 is driven by a gear at its end (not shown) which meshes with a gear of the developer dispenser unit described in application Ser. No. 07/627,678 to drive the photoreceptor 34 rotatively. Therefore, since the surface of the photoreceptor 34 in the exposure plane, i.e. its top surface, is at least as large as the image of the entire document projected at that surface, the actual entire circumferential length of the photoreceptor 34 is at least twice that size. Since in the preferred embodiment, the dimensions of a document image at the exposure plane from side to side are approximately 11 inches, i.e., the height of standard letter size paper, the total circumferential length of the photoreceptor belt is more than 22 inches. In the preferred embodiment, the entire circumferential length of the photoreceptor belt 34 is approximately 26 ¼ inches and its fore and aft dimension is approximately 8 9/16 inches.

We claim:

1. A microfilm viewer/printer for reproducing an image of a document recorded on microfilm onto a receptor sheet, comprising:
   means defining an object plane for holding microfilm bearing a microimage of a document to be reproduced;
   means defining a viewing plane from which a user can view an image of the document;
   a photoreceptor defining an exposure plane; and
   means for selectively projecting an image of the document from said object plane to said viewing plane or to said exposure plane; and
   wherein said exposure plane is substantially horizontally and said viewing plane is substantially vertical.

2. A microfilm viewer/printer as in claim 1, wherein said photoreceptor is sized and shaped to be simultaneously exposed to an image of substantially the entire document.

3. A microfilm viewer/printer as in claim 2, wherein the photoreceptor is a continuous belt which is at least twice as long circumferentially as the corresponding dimension of the image of the document at the exposure plane.

4. A microfilm viewer/printer as in claim 1, wherein said projection means includes the same number of mirrors along a projection path from the object plane tot he viewing plane as the number of mirrors along a projection path from the object plane to the exposure plane.

5. A microfilm viewer/printer as in claim 1, wherein said projection means includes at least two mirrors, at least one of which is movable from a view position in which said one mirror reflects an image in one direction along a projection path from the object plane to the viewing plane to an exposure position in which said one mirror reflects an image in another direction along a projection path from the object plane to the exposure plane.

6. A microfilm viewer/printer for reproducing an image of a document recorded on microfilm onto a receptor sheet, comprising:
   holding means defining an object plane for holding microfilm bearing a microimage of a document to be reproduced;
   means defining a viewing plane on a first side of said holding means from which a user can view an image of the document;
   a photoreceptor defining an exposure plane on a second side of said holding means, said second side being opposite from said first side; and
   means for selectively projecting an image of the document from said object plane to said viewing plane or to said exposure plane; and
   wherein said photoreceptor is sized and shaped to be simultaneously exposed to an image of substantially the entire document at the exposure plane.

7. A microfilm viewer/printer as in claim 6, wherein the photoreceptor is a continuous belt which is at least twice as long circumferentially as the corresponding dimension f the image of the document at the exposure plane.

8. A microfilm viewer/printer as in claim 6, wherein said projection means includes at least two mirrors, one of said mirrors being movable from a view position to an exposure position, said one mirror in the view position reflecting an image in one direction along projection path from the object plane to the viewing plane and said one mirror in said exposure position reflecting an image in another direction along a projection path from the object plane to the exposure plane; and
   wherein the other of said mirrors is movable from a view position to an exposure position, said other mirror in the view position reflecting an image along a projection path from the object plane to the viewing plane and said other mirror int eh exposure position being parked out of the projection path from the object plane to the exposure plane.

9. A microfilm viewer/printer as in claim 8, wherein the exposure position of the other mirror positions said other mirror in a parking zone which is rearward of a projection path from the object plane to the first mirror, below the projection path from the first mirror to a third mirror, and forwardly of a projection path form the third mirror to the exposure plane.

10. A microfilm viewer/printer as in claim 9, wherein the third mirror is a black mirror.

11. A microfilm viewer/printer as in claim 8, wherein said photoreceptor is a continuous belt which is at least twice as long circumferentially as the corresponding dimension of the image of the document at the exposure plane.

12. A microfilm viewer/printer for reproducing an image of a document recorded on microfilm onto a receptor sheet, comprising:
   means defining an object plane for holding microfilm bearing a microimage of a document to be reproduced;
   means defining a viewing plane from which a user can view an image of the document;
   a photoreceptor defining an exposure plane;
   means for selectively projecting an image of the document from said object plane to said viewing plane or to said exposure plane;
   wherein said projection means includes a first mirror and a second mirror, said first mirror being movable from a view position to an exposure position, said first mirror in said view position reflecting an image along a projection path which changes in direction by approximately 270° from the object plane to the viewing plane and said first mirror in said exposure position reflecting an image along a projection path which changes in direction by approximately 180° from the object plane to the exposure plane; and
   wherein said second mirror of said projection means is movable from a view position to an exposure position, said second mirror in said view position being positioned to reflect an image along said projection path from the object plane to the viewing plane and said second mirror in said exposure position being positioned in a parking zone out of said projection path from the object plane to the exposure plane.

13. A microfilm viewer/printer for reproducing an image of a document recorded on microfilm onto a receptor sheet, comprising:
   means defining an object plane for holding microfilm bearing a microimage of a document to be reproduced;
   means defining a viewing plane form which a user can view an image of the document;
   a photoreceptor defining an exposure plane;
   wherein said exposure plane is substantially orthogonal to said viewing plane; and means for selectively projecting an image of the document from said object plane to said viewing plane or to said exposure plane;

wherein said projection means includes at least three mirrors, a first mirror of said three mirrors being selectively positionable between a view position in which it is positioned to reflect an image along a projection path form the object plane to the viewing plane and an exposure position in which said first mirror is positioned to reflect an image along a projection path from the object plane to the exposure plane, said second mirror being selectively positionable between a view position in which it reflects an image along a projection path from the object plane to the viewing plane and an exposure position in which said second mirror is positioned in a parking zone which is out of the projection path from the object plane to the exposure plane, and said third mirror being positioned to reflect an image from said first mirror to said exposure plane.

14. A microfilm viewer/printer as in claim 13, wherein said third mirror is a black mirror 15. A microfilm viewer/printer as in claim 13, wherein the second mirror is driven by an alternating current motor.

16. A microfilm viewer/printer as in claim 13, wherein the first and second mirrors are connected to move in unison 17. A microfilm viewer/printer as in claim 13, wherein said parking zone for said second mirror in its exposure position is rearwardly of the projection path from the object plane to the first mirror, below the projection path from the first mirror to the third mirror, and forwardly of the projection path from the third mirror to the exposure plane.

18. A microfilm viewer/printer as in claim 13, wherein the object plane is substantially horizontal.

19. A microfilm viewer/printer as in claim 18, wherein the exposure plane is substantially horizontal.

* * * * *

UNITED STATES PATENT AND TRADEMARK OFFICE
CERTIFICATE OF CORRECTION

PATENT NO. : 5,153,635

DATED : October 6, 1992

INVENTOR(S) : Todd A. Kahle, Robert E. Gunst and James H. Westoby

It is certified that error appears in the above-identified patent and that said Letters Patent is hereby corrected as shown below:

In col. 3, line 20, after "of the" insert --projection system for the microfilm viewer/printer of Fig. 1;--.

In col. 4, line 18, change "Ser. No. 07/682,2782" to --Ser. No. 07/682,782--.

In col. 4, line 41, change "to them Completed" to --to them. Completed--.

In col. 4, line 68, change "area 20 thereof" to --area 20 thereof.--.

In col. 5, line 51, change "the document In Fig. 5," to --the document. In Fig. 5,--.

In Claim 1, col. 9, lines 14-15, change "horizontally and said" to --horizontal and said--.

In Claim 4, col. 9, line 29, change "tot he viewing" to --to the viewing--.

In Claim 8, col. 9, line 68, change "one direction along" to --one direction along a--.

In Claim 8, col. 10, line 9, change "mirror int eh exposure" to --mirror in the exposure--.

In Claim 9, col. 10, line 17, change "projection path form" to --projection path from--.

UNITED STATES PATENT AND TRADEMARK OFFICE
CERTIFICATE OF CORRECTION

PATENT NO. : 5,153,635

DATED : October 6, 1992

INVENTOR(S) : Todd A. Kahle, Robert E. Gunst and James H. Westoby

It is certified that error appears in the above-identified patent and that said Letters Patent is hereby corrected as shown below:

In Claim 13, col 11, line 8, change "path form the" to --path from the--.

In Claim 16, col. 12, line 8, change "move in unison" to --move in unison.--.

In Abstract, line 5, change "or a horizontal" to --or to a horizontal--.

Signed and Sealed this

Nineteenth Day of October, 1993

*Attest:*

BRUCE LEHMAN

*Attesting Officer*  *Commissioner of Patents and Trademarks*